(12) United States Patent
Schroer et al.

(10) Patent No.: US 11,453,152 B2
(45) Date of Patent: Sep. 27, 2022

(54) DOOR MODULE

(71) Applicant: LANXESS Deutschland GmbH, Cologne (DE)

(72) Inventors: Lukas Schroer, Essen (DE); Detlev Joachimi, Krefeld (DE); Martin Wanders, Odenthal-Neschen (DE); Dirk Bonefeld, Brilon (DE)

(73) Assignee: LANXESS Deutschland GmbH, Cologne (DE)

( * ) Notice: Subject to any disclaimer, the term of this patent is extended or adjusted under 35 U.S.C. 154(b) by 514 days.

(21) Appl. No.: 16/632,470

(22) PCT Filed: Jul. 20, 2018

(86) PCT No.: PCT/EP2018/069773
§ 371 (c)(1),
(2) Date: Jan. 20, 2020

(87) PCT Pub. No.: WO2019/016374
PCT Pub. Date: Jan. 24, 2019

(65) Prior Publication Data
US 2021/0363814 A1    Nov. 25, 2021

(30) Foreign Application Priority Data

Jul. 21, 2017 (DE) ..................... 20 2017 003 886.2

(51) Int. Cl.
| | | |
|---|---|---|
| *C08K 3/08* | (2006.01) | |
| *B29C 45/56* | (2006.01) | |
| *C08J 5/24* | (2006.01) | |
| *B29C 45/00* | (2006.01) | |
| *C08K 5/00* | (2006.01) | |
| *B60J 5/04* | (2006.01) | |

(52) U.S. Cl.
CPC ........ *B29C 45/561* (2013.01); *B29C 45/0005* (2013.01); *C08J 5/244* (2021.05); *C08J 5/249* (2021.05); *C08K 3/08* (2013.01); *C08K 5/005* (2013.01); *B60J 5/048* (2013.01); *C08J 2377/02* (2013.01); *C08K 2003/085* (2013.01)

(58) Field of Classification Search
USPC .................................................. 428/137, 138
See application file for complete search history.

(56) References Cited

U.S. PATENT DOCUMENTS

| 2015/0375478 A1 | 12/2015 | Gruhn et al. |
| 2016/0214359 A1 | 7/2016 | Elia et al. |
| 2017/0362401 A1 | 12/2017 | Seidel et al. |

FOREIGN PATENT DOCUMENTS

| EP | 2886305 A1 | 6/2015 |
| EP | 3150756 A1 | 4/2017 |

OTHER PUBLICATIONS

International Search Report from corresponding International Application No. PCT/EP2018/069773, dated Oct. 30, 2018, three pages.

*Primary Examiner* — Terressa Boykin
(74) *Attorney, Agent, or Firm* — Nicanor A. Kohncke; Christopher L. McDavid; Ewa M. Wozniak

(57) ABSTRACT

The present invention relates to door modules comprising at least one single-layer, continuous fiber-reinforced semifinished fiber matrix product which is obtained by impregnating semifinished fiber products with at least one thermoplastic, and to the use thereof in vehicles or in buildings.

15 Claims, No Drawings

DOOR MODULE

The present invention relates to door modules comprising at least one single-layer, continuous fiber-reinforced semifinished fiber matrix product which is obtained by impregnating semifinished fiber products with at least one thermoplastic, and to the use thereof.

PRIOR ART

There are ongoing efforts in modern vehicle construction to develop structural parts and trim parts from fiber-reinforced plastic. Fiber-reinforced plastics (FRPs) are used generally in vehicle construction where high strengths and stiffnesses are required. In principle, FRPs include reinforcing fibers embedded in a matrix of plastic. The fibers endow the component with its mechanical properties. The highest mechanical properties are achieved here when the fibers are oriented extending in the direction in which the force flows. In order to further reduce the component weight given adequately high mechanical properties, components that have particularly thin walls and have been reinforced only at predetermined sites are produced. In the production of such FRP-based components, however, it has to be ensured with a high degree of complexity that the reinforcing elements do not leave or slip away from their predetermined position in an unwanted manner.

DE 602 11 521 T2 describes a door module for covering a recess cut out of the surface of the inner wall of a vehicle door, wherein the door module comprises an essentially rigid structure section composed of plastic reinforced with long glass fibers, and an essentially elastic functional section made of plastic that contains essentially no long glass fibers and has been shaped in one piece with the structure section.

DE 10 2004 011 136 A1 discloses a door construction having a window frame, a function carrier connectable to the window frame and an outer skin arranged on the outside of the function carrier and optionally of the window frame, wherein, in one embodiment, the function carrier has a thermoplastic matrix which is preferably fiber-reinforced at least in parts.

EP 1 765 621 B1 describes a door module or side module for a vehicle door or a vehicle sidewall for separation of a wet side from a dry side, consisting at least partly of a fiber-reinforced plastic.

DE 20 2006 005 797 U1 describes a door module carrier designed and intended for incorporation of functional components of a motor vehicle door and for incorporation into a motor vehicle door, having at least two material regions consisting of a different material, these consisting of different plastic materials and being produced together in a casting mold.

DE 10 2013 213711 A1, finally, describes a method of producing a structural component for motor vehicles that may also be a door module, by thermoforming a semifinished product made of thermoplastic and reinforced with incorporated continuous fibers in sheet form ("organosheet"), wherein regions of the organosheet provided for accommodation of the organosheet in a thermoforming device and/or sections of the structural component produced from the organosheet that are subjected to elevated stress, these are more highly structured and/or subjected to a particular thermal treatment in the course of thermoforming.

The production of organosheets, also referred to in the context of the present invention as composites or semifinished fiber matrix products, is known to the person skilled in the art. A common factor to all is the embedding of fiber materials/semifinished fiber products into a plastic matrix. Customary embedding methods are injection molding/casting according to DE 102008052000 A1, foaming, pressing/compression molding, compression of resin-impregnated woven sheets (prepregs) according to EP 0291629 A2, pultrusion according to EP 2028231 A1, calendering according to DE 102009053502 A1 or laminating (EP 1923420 A1). EP 1923420 A1 describes the typically layered construction of organosheets, wherein a first group of reinforcing fibers is coupled via a first fiber matrix adhesion to the matrix of plastic and a second group of reinforcing fibers is coupled via a second fiber matrix adhesion to the matrix of plastic. The second fiber matrix adhesion is lower than the first fiber matrix adhesion. By virtue of the different formation of the fiber matrix adhesion, in the event of total failure, improved fracture characteristics are said to be achieved. However, a disadvantage of the prior art semifinished fiber matrix products is that adhesion of the layers to one another is not always satisfactory within such a composite and, more particularly, adhesion of the outer layers to the lower-lying layers is not always satisfactory. This adhesion can be impaired by the effect of temperature or by frequent fluctuations in temperature. The result is at least partial delamination of the outer layers of a composite over the course of time. For instance, modern door modules have to withstand constantly changing outside temperatures, but additionally also have low-temperature stability when the door modules are installed in vehicles that are used in extremely cold climate zones. Low temperatures in the context of the present invention are temperatures It was an object of the present invention to provide door modules based on organosheets that fulfill the high demands on lightweight construction in vehicles, withstand the frequent temperature fluctuations and simultaneously feature high impact resistance and, as far as possible, low-temperature stability in that they have less of a tendency to delamination compared to prior art organosheets.

Invention

This object is achieved by the subject matter of the present invention: door modules comprising at least one single-layer semifinished fiber matrix product in which 1 to 100 semifinished fiber product plies of continuous fibers, preferably 2 to 40 semifinished fiber product plies of continuous fibers, more preferably 2 to 10 semifinished fiber product plies of continuous fibers, wherein the semifinished fiber product plies each have a basis weight in the range from 5 g/m$^2$ to 3000 g/m$^2$, preferably in the range from 100 g/m$^2$ to 900 g/m$^2$, more preferably in the range from 150 g/m$^2$ to 750 g/m$^2$, and the entirety of all semifinished fiber product plies has been impregnated with at least one thermoplastic having an MVR to ISO 1133 in the range from 1 cm$^3$/10 min to 100 cm$^3$/10 min, wherein the thermoplastic is selected from the group of the polyolefins, vinyl polymers, polyacrylates, polyamides, polyurethanes, polyureas, polyimides, polyesters, polyethers, polystyrenes, polyhydantoins, polyphenylene oxides (PPOs), polyarylene sulfides, polysulfones, polycarbonates (PCs), polyphthalamides (PPAs), polymethylmethacrylates (PMMAs), styreneacrylonitriles (SANs), TPOs (olefin-based thermoplastic elastomers), TPUs (thermoplastic polyurethanes) and polyoxymethylenes (POMs), and the semifinished fiber matrix product has a proportion by volume of fiber materials defined according to DIN 1310 in the range from 5% to 90% by volume, preferably in the range from 30% to 60% by volume, more preferably in the range 45% to 55% by volume, and has a proportion by volume of air or gas of less than 15% by volume, preferably less than 10% by volume more preferably less than 5% by volume.

Preferably, in accordance with the invention, single-layer semifinished fiber matrix products to be used in door modules have a material thickness in the range from 0.05 mm to 6 mm, more preferably in the range from 0.1 mm to 2 mm, most preferably in the range from 0.3 mm to 1.0 mm.

The present invention also relates to a process for producing door modules, in which a single-layer semifinished fiber matrix product is subjected to a shaping process, then cured, and removed from the negative mold of a door module.

By way of clarification, it should be noted that the scope of the invention encompasses all definitions and parameters that are mentioned in general terms or within areas of preference in any combinations.

"Single-layer" in the context of the present invention means that there are no regions or sections within the semifinished fiber matrix product which is to be used in accordance with the invention and is usually in sheet form at first, i.e. in the region between upper surface and lower surface, that have a proportion by volume of air or gas or a proportion by volume of fiber materials outside the ranges mentioned above or claimed. A distinction between matrix resin composition and surface resin composition as in the prior art is no longer possible owing to the high degree of impregnation of the entirety of all semifinished fiber product plies with thermoplastic and the associated or subsequent consolidation. Thermoplastic in the context of the present invention additionally means any mixtures of the aforementioned thermoplastics and mixtures of the aforementioned thermoplastics with at least one filler and/or reinforcer or additive, also referred to as compounds. All standards described in the context of the present application are applicable in their version that was valid at the filing date, unless stated otherwise.

The technical superiority of single-layer semifinished fiber matrix products is demonstrated in the context of the present invention by the fin pull-off test using a cross tension sample as familiar to those skilled in the art from W. Siebenpfeiffer, Leichtbau-Technologien im Automobilbau [Lightweight Construction Technologies in Automobile Construction], Springer-Wieweg, 2014, pages 118-120 and as described in the examples.

Definitions of Terms

Melt volume flow rate (MVR) serves for characterization of the flow characteristics of a thermoplastic under particular pressure and temperature conditions. It is a measure of the viscosity of a plastics melt. It can be used to conclude the degree of polymerization, this being the average number of monomer units in one molecule. MVR to ISO 1133 is determined by means of a capillary rheometer, by melting the material, preferably in the form of pellets or powder, in a heatable cylinder and forcing it, under a pressure resulting from the applied load, through a defined nozzle, preferably capillary. A determination is made of the emerging volume/mass of the polymer melt, called the extrudate, as a function of time. A key advantage of the melt volume flow rate is the simplicity of measuring the piston travel for a known piston diameter to determine the volume of melt that has emerged. The unit for MVR is $cm^3/10$ min.

Compounding/compound is a term from the plastics industry, synonymous with plastics processing, that describes the process of upgrading plastics by mixing in admixtures, especially fillers, additives etc., for specific optimization of the profiles of properties. Compounding is preferably effected in extruders and comprises the process operations of conveying, melting, dispersing, mixing, degassing and pressure buildup. Dispersing is preferably effected by means of a melt-mixing process in at least one mixing tool. Mixing tools are preferably single- or twin-screw extruders or Banbury mixers. The individual components of a thermoplastic composition are mixed in at least one mixing tool, preferably at temperatures in the region of the melting point of the at least one thermoplastic in the thermoplastic composition, and discharged in strand form. Typically, the strand is cooled down until pelletizable and then pelletized. The thermoplastic or thermoplastic composition is generally ultimately in the form of pellets, flakes or of other macroscopic parts.

The terms "above", "at" or "about" used in the present description are intended to mean that the quantity or value that follows may be the specific value or a roughly equal value. The expression is intended to convey that similar values lead to results or effects that are equivalent according to the invention and are encompassed by the invention.

A "fiber" in the context of the present invention is a macroscopically homogeneous body having a high ratio of length to its cross-sectional area. The fiber cross section may be any desired shape but is generally round or oval.

According to "http://de.wikipedia.org/wiki/Faser-Kunststoff-Verbund" a distinction is made between
- chopped fibers, also known as short fibers, having a length in the range from 0.1 to 1 mm,
- long fibers having a length in the range from 1 to 50 mm and
- continuous fibers having a length L>50 mm.

Fiber lengths can be determined for example by microfocus x-ray computed tomography (µ-CT); J. Kastner et. al., Quantitative Messung von Faserlängen und -verteilung in faserverstärkten Kunststoffteilen mittels µ-Röntgen-Computertomographie [Quantitative Measurement of Fiber Lengths and Distribution in Fiber-Reinforced Plastics Components by means of µ-X-Ray Computed Tomography], DGZfP [German Society for Non-Destructive Testing] annual meeting 2007—lecture 47, pages 1-8. Semifinished fiber matrix products to be used in accordance with the invention contain continuous fibers. In one embodiment, they may contain long fibers in addition to the continuous fibers.

The term "semifinished fiber product plies" used in the context of the present application means a material which is either preferably selected from the group of weaves, laid scrims including multiaxial laid scrims, knits, braids, nonwovens, felts and mats, or else is in the form of unidirectional fiber strands. Alternatively, semifinished fiber product plies, in accordance with the invention, also means a mixture or combinations of two or more of the materials mentioned in this section.

For production of semifinished fiber product plies, the fibers to be used are bonded to one another in such a way that at least one fiber or a fiber strand is in contact with at least one other fiber or other fiber strand in order to form a continuous material. Alternatively, the fibers used for production of the semifinished fiber product plies are in contact with one another so as to form a continuous mat, weave, textile or similar structure.

The term "basis weight" describes the mass of a material as a function of its area, and in the context of the present invention relates to the dry fiber layer. The basis weight is determined according to DIN EN ISO 12127.

"Impregnated" in the context of the present invention means that the at least one thermoplastic or, if appropriate, the thermoplastic composition penetrates into the depressions and cavities of the entirety of all semifinished fiber product plies and wets the fiber material. "Consolidated" in the context of the present invention means that an air content of less than 15% by volume is present in the composite structure. Impregnation (wetting of the fiber material by the polymer composition) and consolidation (minimizing the proportion of enclosed gases) can be effected and/or performed simultaneously and/or consecutively.

In the context of the present invention, the following symbols have the following meaning: ≥ means not less than, ≤ means not more than, > means greater than, < means less than.

By way of clarification, it should be noted that single-layeredness is defined by the entirety of the features pertaining to the semifinished fiber product plies, the basis weight thereof, the thermoplastic to be used, the proportion by volume of fibers and the proportion by volume of air or gas in relation to the entire fiber matrix semifinished product, i.e. in the region of the upper surface and the lower surface. A semifinished fiber matrix product for use in accordance with the invention is preferably notable in that these features are uniformly present therein as a result of the impregnation process and the consolidation.

"Uniformly" therefore more particularly describes the fact that there are no regions or sections within the semifinished fiber matrix product of the invention, preferably in the region between upper surface and lower surface, that have a proportion by volume of air or gas or a proportion by volume of fiber materials outside the ranges mentioned above or claimed.

PREFERRED EMBODIMENTS OF THE INVENTION

The present invention also relates to a process for producing a door module by subjecting at least one single-layer semifinished fiber matrix product as described above to a shaping process, then curing it and removing it from the negative mold of a door module.

Preferably, the semifinished fiber matrix product is provided as continuous material in sheet form for the production of a door module. Such semifinished fiber matrix products in sheet form can be cut to the desired final shape in a simple manner, such that less material is lost in the cutting operation.

Semifinished fiber matrix products are the subject of extensive research and are described, for example, in Composites Technologien, Die Verarbeitung von FV-Thermoplasten [Composites Technologies, The Processing of FR Thermoplastics], ETH Zürich IMES-ST, chapter 9, version 3.0, October 2004. While the fibers in semifinished fiber matrix products are crucial in determining the mechanical properties of such a composite, such as strength and stiffness, it is the polymer matrix that transmits the forces between the fibers, supports the fibers against buckling and protects them from external attack. The fibers may firstly be oriented in just one direction (unidirectional, for example as a tape), may run in two directions at right angles to one another (orthotropic or balanced) or may be positioned at any desired angle to one another in quasi-isotropic fashion. Continuous fibers have the advantage that they can be introduced into the polymer matrix in a highly extended state with a high degree of orientation and thus in relatively large amounts. Moreover, they enable transmission of force between force application points within semifinished fiber matrix products solely via the fibers, thus increasing the mechanical performance of a component based on such continuous fiber-reinforced semifinished fiber matrix products.

Semifinished fiber matrix products for use in accordance with the invention are produced by impregnating the semifinished fiber products made of continuous fibers for use in accordance with the invention. The invention therefore also relates to a process for producing a door module, in which at least one single-layer semifinished fiber matrix product is subjected to a shaping process, then cured, and removed from the mold.

If the production process for the semifinished fiber matrix product is combined with the shaping process, the shaping step is preceded by the process steps of impregnating and consolidating and optionally solidifying the entirety of all semifinished fiber product plies with at least one thermoplastic or with a thermoplastic composition. The overall process preferably comprises the process steps of a) providing at least one thermoplastic or providing a thermoplastic composition, b) providing semifinished fiber product plies made of continuous fibers, c) applying the at least one thermoplastic or thermoplastic composition to the entirety of all semifinished fiber product plies, d) impregnating the entirety of all semifinished fiber product plies with at least one thermoplastic or with the thermoplastic composition, e) removing air from the entirety of all semifinished fiber product plies impregnated with at least one thermoplastic or thermoplastic composition and removing the excess thermoplastic resin (consolidating), f) shaping to give the door module, g) curing the door module composed of at least with one thermoplastic or thermoplastic composition impregnated and consolidated entirety of all semifinished fiber product plies (solidification) and removing it from the mold.

In one embodiment, process step g) may be followed by process step h) heat treatment.

In one embodiment, process step g) or process step h) may be followed by process step i) an aftertreatment of the door module.

Preference is given to employing a laminating method in the impregnation. In one embodiment, in addition to the continuous fibers, it is also possible for long fibers and/or short fibers to be present in the single-layer semifinished fiber matrix product for use in accordance with the invention.

The process of the invention is of particularly good suitability for semicontinuous or continuous pressing processes, preferably in twin belt presses, interval heating presses or continuous compression molds. The process of the invention is notable for rapid impregnation and high productivity and permits production of semifinished fiber matrix products and hence door modules at high rates and with a low proportion of pores or air inclusions in a single process.

Process Step a)

According to the invention, the thermoplastic selected, or used as a base component for the thermoplastic composition, is a thermoplastic from the group of polyamide (PA), polycarbonate (PC), thermoplastic polyurethane (TPU), polybutylene terephthalate (PBT), polyphenylene sulfide (PPS), polyphthalamide (PPA), polypropylene (PP), polyethylene terephthalate (PET), polyethylene (PE), polylactic acids (PLA), acrylonitrile-butadiene-styrene (ABS), styrene-acrylonitrile (SAN), polyether ether ketone (PEEK), polyether imide (PEI), polyether sulfone (PES), polymethylmethacrylate (PMMA), polyoxymethylene (POM) and polystyrene (PS).

Preferred vinyl polymers should be selected from the group of polyvinyl halides, polyvinyl esters and polyvinyl ethers.

Preferred polyolefins are polyethylene [CAS No. 9002-88-4] or polypropylene [CAS No. 9003-07-0].

Preferred polyesters are polyethylene terephthalate PET [CAS No. 25038-59-9] or polybutylene terephthalate PBT [CAS No. 24968-12-5].

Preferred polycarbonates are those based on 2,2-bis(4-hydroxyphenyl)propane (bisphenol A), bis(4-hydroxyphenyl) sulfone (bisphenol S), dihydroxydiphenyl sulfide, tetramethylbisphenol A, 1,1-bis(4-hydroxyphenyl)-3,3,5-trimethylcyclohexane (BPTMC) or 1,1,1-tris(4-hydroxyphenyl)ethane (THPE). Particular preference is given to using a PC based on bisphenol A.

PPAs are partially aromatic polyamides or semicrystalline aromatic polyamides in which the amide groups are bonded alternately to aliphatic groups and to benzenedicarboxylic acid groups. The amide groups are preferably bonded to terephthalic acid groups. PAAs particularly preferred in accordance with the invention are PA 6T, PA 10T or PA 12T.

Particularly suitable polyamides are those having a relative solution viscosity in m-cresol in the range from 2.0 to 4.0, preferably in the range from 2.2 to 3.5, very particularly in the range from 2.4 to 3.1. Relative solution viscosity $\eta_{rel}$ is measured in accordance with EN ISO 307. The ratio of the outflow time t of the polyamide dissolved in m-cresol to the outflow time t(0) of the m-cresol solvent at 25° C. gives the relative solution viscosity by the formula $\eta_{rel}=t/t(0)$.

Particularly preferred polyamides should be selected from the group of PA 66, PA 6 and PA 12. The nomenclature of the polyamides used in the context of the present application corresponds to EN ISO 1874-1:2010, now partly superseded by ISO 16396-1:2015, the first figure(s) giving the number of carbon atoms in the starting diamine and the last figure(s) the number of carbon atoms in the dicarboxylic acid. If only one number is stated, as in the case of PA6, this means that the starting material was an α,ω-aminocarboxylic acid or the lactam derived therefrom, i.e. ε-caprolactam in the case of PA 6.

More preferably, at least one thermoplastic is selected from the group of PA 66 [CAS No. 32131-17-2], PA 6 [CAS No. 25038-54-4], PA 12, PPA, polypropylene (PP), polyphenylene sulfide (PPS), TPU and PC for the plastics matrix of the semifinished fiber matrix product.

Most preferably, at least one thermoplastic is selected from the group of TPU, PA 6 and PC, especially preferably PA 6.

The thermoplastics to be used in the single-layer semifinished fiber matrix product for door modules may also be used in a wide variety of combinations with one another, preference being given to using a combination of PC/ABS (ABS [CAS No. 9003-56-9]).

Especially preferably, at least one thermoplastic in flame-retardant form is used for the polymer matrix or as matrix polymer for the semifinished fiber matrix product. Flame retardants preferred in accordance with the invention for polyamide-based semifinished fiber matrix products are described in EP 1762592 A1, EP 2060596 A1, EP 2028231 A1, JP 2010 222486 A or EP 2410021 A1, the contents of which are fully encompassed by the present application. Flame retardants preferred in accordance with the invention for polycarbonate-based semifinished fiber matrix products are described in EP 3020752 A1.

Flame retardants preferred in accordance with the invention for TPU-based semifinished fiber matrix products are described in WO 2013/087733 A2. Preference is given to using 0.001 to 20 parts by weight of flame-retardant additive per 100 parts by weight of thermoplastic, especially polyamide.

Apart from flame-retardant additives, the thermoplastic may alternatively or additionally comprise further additives, preferably at least one thermal stabilizer. Preferred thermal stabilizers are metal-based stabilizers, preferably based on copper or iron, or organic thermal stabilizers, especially polyhydric alcohols. Preferred copper stabilizers are copper (I) halides, especially copper bromide or copper iodide, which are preferably used in combination with at least one alkali metal halide, preferably potassium bromide or potassium iodide. Preferred iron-based thermal stabilizers are iron powder, iron oxides or iron salts of organic acids, especially iron citrate or iron oxalate. A polyhydric alcohol to be used with preference is dipentaerythritol. In one embodiment, it is also possible to use mixtures of the thermal stabilizers mentioned in the thermoplastic or thermoplastic composition. Preference is given to using the thermal stabilizers mentioned in polyamide.

Particular preference is given to using 0.001 to 20 parts by weight of thermal stabilizer per 100 parts by weight of thermoplastic, especially polyamide.

Further additives in the thermoplastic for use in accordance with the invention for production of a thermoplastic composition for the single-layer semifinished fiber matrix product to be used in accordance with the invention also include the short glass fibers already described above and other fillers or reinforcers, preferably to be selected from the group of carbon fibers, glass beads, amorphous silica, calcium silicate, calcium metasilicate, magnesium carbonate, kaolin, chalk, powdered quartz, mica, barium silicate, wollastonite, montmorillonite, boehmite, bentonite, vermiculite, hectorite, laponite, carbon black and feldspar. In addition, it is possible to use sterically hindered phenols, antioxidants, dyes, oxidation retardants, demolding agents, nucleating agents, plasticizers or impact modifiers as additive. Preferred impact modifiers are elastomeric polymers.

Preferably, the short glass fibers or any other fillers and reinforcers or additives are dispersed or compounded in the thermoplastic before application to the entirety of all semifinished fiber product plies for the purpose of producing a single-layer semifinished fiber matrix product for use in accordance with the invention. The dispersing is preferably effected by means of melt-mixing methods. Mixing apparatuses to be used for such a melt mixing process are preferably single- or twin-screw extruders or Banbury mixers. The additives are mixed either all at once in a single stage, or stepwise and then in the melt. In the case of stepwise addition of the additives to the at least one thermoplastic, a portion of the additives is first added to the thermoplastic and mixed in the melt. Further additives are then added and the mixture is mixed until a homogeneous composition is obtained.

Process Step b)

Preferably, the entirety of all semifinished fiber product plies in the single-layer semifinished fiber matrix product to be used in accordance with the invention is based on glass fibers and/or carbon fibers, more preferably glass fibers. For glass fibers, preference is given to using silicatic or nonsilicatic glasses. As well as the glass fibers, it is additionally also possible for other fibers to be present in the entirety of all semifinished fiber product plies, more preferably from the group of carbon, boron, aramid, silicon carbide, metal alloys, metal oxides, metal nitrides, metal carbides, metals and silicates, and organic materials, especially natural or synthetic polymers, preferably polyesters, polyamides or natural fibers, especially cotton or cellulose and combinations thereof.

Preference is given in accordance with the invention to using continuous fibers in combination with long fibers of length at least 10 mm. The continuous fibers are present in the semifinished fiber product plies preferably in the form of rovings, strands, yarns, twines or cords, more preferably as rovings.

Continuous fibers, also referred to as continuous reinforcing fibers, are understood to mean those which, as described above, generally have a length of more than 50 mm, but in particular those having a length that corresponds roughly to the length dimension of the particular door module to be produced.

Preferably, the continuous fibers have filament diameters in the range from 0.5 µm to 25 µm. In the context of the present invention, filament diameters and cross-sectional areas of filament yarns made of glass, aramid or carbon are determined in accordance with DIN 65571-1:1992-11. The average filament diameter is measured after removal of any sizes. Filament diameter and cross-sectional area of filament yarns are determined in accordance with DIN 65571 by means of optical methods, either by light microscope and micrometer ocular (distance measurement of cylinder diameter) or by light microscope and digital camera with subsequent planimetry (measurement of cross section) or by laser interferometry or by projection. Alternatively, the average filament diameter of glass fibers can be determined in accordance with ISO 1888.

In one embodiment, any long glass fibers present in the semifinished fiber matrix product in addition to the continuous fibers have a flat shape with a non-circular cross-sectional area, where the ratio of the cross-sectional axes at right angles to one another is not less than 2, especially not less than 3, and the smaller cross-sectional axis has a length of ≥3 µm. More particularly, preference is given to a long glass fiber of very substantially rectangular cross section in which the ratio of the cross-sectional axes is greater than 3, especially not less than 3.5.

The long glass fibers that are likewise preferably to be used as rovings have a diameter in the range from 3 to 20 µm, more preferably in the range from 3 to 10 µm.

Particular preference is given to using flat long glass fibers having a ratio of the cross-sectional axes in the range from 3.5 to 5.0.

Especially preferably, E glass fibers are used both for the continuous fibers and for the long glass fibers. In one embodiment, as well as the E glass fibers, S glass fibers are additionally used since these have a tensile strength 30% higher than the E glass fibers. It is alternatively possible to use all other glass fibers, such as A, C, D, M or R glass fibers, or any mixtures thereof, or mixtures with E and/or S glass fibers. E glass has the following properties: density 2.6 g/cm$^3$ at 20° C., tensile strength 3400 MPa, tensile modulus of elasticity 73 GPa, elongation at break 3.5-4%.

The semifinished fiber product plies made of continuous fibers that are to be used in accordance with the invention endow the door module with the desired mechanical properties. They can be matched to expected stresses in the door module in terms of their structure, but also in terms of their number, such that the door module has optimal strength and/or stiffness for real loads.

The semifinished fiber product plies in the single-layer semifinished fiber matrix product to be used in accordance with the invention do not form layers separate from the polymer matrix as in the prior art, but are penetrated thereby, such that fibers and polymer form an integral constituent.

More particularly, it is advantageous when the semifinished fiber product plies are used in the form of woven or nonwoven structures. Preference is given to using semifinished fiber product plies based on weaves, scrims including multiaxial scrims, embroidery, braids, nonwovens, felts, mats, a mixture of two or more of these materials, and combinations thereof.

Nonwovens may be selected with random fiber alignment or with aligned fiber structures. Random fiber orientations are preferably found in mats, in needled mats or in the form of felt. Aligned fibrous structures are preferably found in unidirectional fiber strands, bidirectional fiber strands, multidirectional fiber strands, multiaxial textiles. Preferably, semifinished fiber product plies to be used in accordance with the invention are unidirectional scrims or weaves, especially weaves.

Particular preference is given to combining glass fibers with carbon fibers, also referred to as carbon fibers or graphite fibers. Exchange of a portion of the glass fibers for carbon fibers gives rise to a hybrid fiber-reinforced semifinished fiber matrix product that has increased stiffness compared to a purely glass fiber-based semifinished fiber matrix product.

The content of carbon fibers in a single-layer semifinished fiber matrix product for use for door modules in accordance with the invention is preferably in the range from 0.1% by volume to 30% by volume, more preferably in the range from 10% by volume to 30% by volume, based on the total fiber content, where the total fiber content in the semifinished fiber matrix product to be used in accordance with the invention is in the range from 5% to 90% by volume, preferably in the range from 30% to 60% by volume, more preferably in the range from 45% to 55% by volume.

The fiber material or else fiber braid in the semifinished fiber product plies may be oriented solely in one direction or oriented in two directions at any angle relative to one another, preferably at right angles to one another.

In order to obtain better compatibility of the continuous fibers with the at least one thermoplastic or with the thermoplastic composition, these are preferably pretreated with a silane compound on their surface. Particular preference is given to silane compounds of the general formula (I)

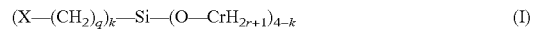

(I)

in which
X is NH$_2$—, carboxyl-, HO— or

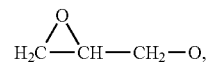

q is an integer from 2 to 10, preferably 3 to 4,
r is an integer from 1 to 5, preferably 1 to 2, and
k is an integer from 1 to 3, preferably 1.

Especially preferred are silane compounds from the group of aminopropyltrimethoxysilane, aminobutyltrimethoxysilane, aminopropyltriethoxysilane, aminobutyltriethoxysilane, and the corresponding silanes containing a glycidyl group or a carboxyl group as the X substituent in formula (I), very particular preference being given to carboxyl groups in particular.

The modification of the glass fibers with at least one silane compound of formula (I) is preferably effected in amounts of 0.05 to 2 parts by weight of silane compound per 100 parts by weight of glass fibers.

Preferably, the semifinished fiber product plies do not contain any fibers or particles that have been reduced in size, and especially does not contain any short fibers having a length in the range from 0.1 to 1 mm.

Preference is given to using glass fibers and/or carbon fibers, more preferably composed of glass fibers.

In one embodiment, the semifinished fiber product plies are provided as roll material for process step b).

Process Step c)

For the application to the entirety of all semifinished fiber product plies, the at least one thermoplastic or thermoplastic formulation, in the form of pellets, powder, flakes, film or in the form of other macroscopic parts, is initially charged in the form of a melt thereof or in the form of a dispersion in a solvent. Particular preference is given to powder or films. Preference is given in accordance with the invention to the application of powder or application in the form of a film, especially the application of powder.

The thermoplastic or thermoplastic composition is applied to the entirety of all semifinished fiber product plies in process step c) by conventional means, preferably by scattering, trickling, printing, spraying, irrigating, impregnating, wetting in a melt bath, thermal spraying or flame spraying, or by fluidized bed coating methods. In one embodiment, it is possible to apply multiple thermoplastic layers or layers of a single thermoplastic composition or different thermoplastic compositions to the entirety of all semifinished fiber product plies. In one embodiment, the thermoplastic or thermoplastic composition is applied in the form of a film to the entirety of all semifinished fiber product plies made of continuous fibers.

Preferably, the thermoplastic or thermoplastic composition is applied to the entirety of all semifinished fiber composite plies in amounts that result in a proportion by volume of fiber materials, defined in accordance with DIN 1310, in the semifinished fiber matrix product in the range from 5% to 90% by volume, preferably in the range from 30% to 60% by volume, more preferably in the range from 45% to 55% by volume.

In one embodiment, the application may be followed by a sintering step in which the thermoplastic or thermoplastic composition on the entirety of all semifinished fiber product plies is sintered. The sintering, optionally under pressure, heats the thermoplastic or thermoplastic composition, but the temperature remains below the melting temperature of the thermoplastic to be used in each case. There is generally shrinkage here because the thermoplastic particles of the starting material become denser and pore spaces in the entirety of all semifinished fiber product plies are filled up.

Process Step d)

Subsequently, the entirety of all semifinished fiber product plies that has been contacted in process step d) is subjected to the influence of pressure and temperature. This is preferably effected with preheating of the entirety of all semifinished fiber product plies that has been contacted with polymer or the polymer composition, also referred to as fiber material, outside the pressure zone.

In process step d), the entirety of all semifinished fiber product plies that has been contacted with thermoplastic or thermoplastic composition is heated up in order to initiate the impregnation and consolidation of the fiber material. The influence of pressure and heat results in melting of the at least one thermoplastic or thermoplastic composition and penetration of the entirety of all semifinished fiber product plies, which are thus impregnated. Preference is given here to employing pressures in the range from 2 to 100 bar, more preferably in the range from 10 to 40 bar.

The temperature to be employed in process step d) is ≥ the melting temperature of the at least one thermoplastic to be used or of the thermoplastic composition. In one embodiment, the temperature to be employed is at least 10° C. above the melting temperature of the at least one thermoplastic to be used. In a further embodiment, the temperature to be employed is at least 20° C. above the melting temperature of the at least one thermoplastic to be used. Heating may be effected by a great many means, preferably contact heating, radiative gas heating, infrared heating, convection or forced convection, induction heating, microwave heating or combinations thereof. Consolidation is effected immediately thereafter.

The impregnation depends in particular on the parameters of temperature and pressure. In one embodiment, process step d) is additionally dependent on time.

For achievement of optimal mechanical properties in process step d), maximum impregnation of the filaments of the fiber material with the at least one thermoplastic or with the thermoplastic composition is desirable. It has been found that, in the presence of fiber material composed of glass fibers, there is a rapid impregnation rate of fiber material composed of carbon fibers, which leads to a quicker overall production cycle overall for single-layer semifinished fiber matrix products that contain both glass fibers and carbon fibers.

The principle of impregnation is the saturation of a dry fibrous structure with a matrix composed of polymer or polymer composition. The flow through the semifinished fiber product is comparable with the flow of an incompressible fluid through a porous base medium. The flow is described using the Navier-Stokes equation:

$$\rho \frac{dv}{dt} = -\nabla P + \eta \nabla^2 v$$

in which $\rho$ is the density, v the velocity vector, $\nabla P$ the pressure gradient and $\eta$ the viscosity of the fluid used. If it is assumed that the flow velocity of the polymer or polymer composition—also referred to as the matrix—in the reinforcing structure can be classified as low, the inertia forces in the above equation (the left-hand side thereof) can be neglected. The equation is accordingly simplified to the form known as the Stokes equation:

$$0 = -\nabla P + \eta \nabla^2 v$$

Process Step e)

At the same time as the impregnation or after the impregnation, consolidation takes place, which is understood to mean the expression of enclosed air and of other gases. Consolidation also depends in particular on the parameters temperature and pressure and may depend on time.

The gases contain gas from the environment (e.g. air or nitrogen) and/or water/steam and/or thermal breakdown products of the at least one thermoplastic to be used.

The consolidation is also dependent on the parameters of temperature and pressure. In one embodiment, process step e) is additionally dependent on time.

Preferably, the parameters specified are employed until the semifinished fiber matrix product has a void content of less than 5%. The aim is more preferably that the void content of less than 5% is achieved within a period of less than 10 minutes at temperatures above 100° C., more preferably at temperatures in the range from 100° C. to 350° C. It is preferable to employ pressures above 20 bar.

Pressure can be applied via a static process or via a continuous process (also known as a dynamic process), preference being given to a continuous process for reasons of speed. Preferred impregnation techniques include, without limitation, calendering, flat bed lamination and twin belt press lamination. Preference is given to conducting the impregnation step as a lamination method. When the impregnating is performed in the form of laminating, preference is given to using a cooled twin belt press (see also EP 0 485 895 B1) or an interval heating press.

Both properties, the degree of impregnation in process step d) and the consolidation in process step e), can be measured/checked by determination of mechanical indices, in particular by measurement of the tensile strength in composite structure test specimens.

Tensile strength is determined using the tensile test, a quasistatic, destructive test method performed, in the case of plastics, according to ISO 527-4 or -5.

Since both the impregnation operation and the consolidation operation are dependent on the parameters of temperature and pressure, those skilled in the art will adapt these parameters to the thermoplastic to be used in each case or to the thermoplastic in the thermoplastic composition. Those skilled in the art will also adapt the duration over which the pressure is applied according to the matrix polymer.

Process Step f)

After process step e), within a single-layer semifinished fiber matrix product to be used in accordance with the invention, the fibers have been fully impregnated and consolidated with thermoplastic or with thermoplastic composition, i.e. the fibers have been fully wetted with plastic; there is virtually no air in the material.

For solidification, the fiber composite structure or the semifinished fiber matrix product can be cooled down to a temperature below the melting temperature of the thermoplastic or of the thermoplastic composition. The term "solidification" describes the setting of the mixture of the entirety of all semifinished fiber product plies and molten matrix through cooling or through chemical crosslinking to afford a solid body.

In one embodiment, after process step e), process steps f) shaping and g) solidification are conducted simultaneously or at least in quick succession.

In one embodiment, when a twin belt press is used, solidification and shaping of the single-layer semifinished fiber matrix product are preferably effected to give sheet material. In this case, the single-layer semifinished fiber matrix product, after cooling down to a temperature below the melting temperature of the thermoplastic or of the thermoplastic composition, preferably to room temperature (23+/−2° C.), is withdrawn from the press mold in the form of sheet material. The shaping to give the door module is then effected by reheating or plastifying in the manner described above and by subsequent shaping. Preference is given here to employing short cycle times. What is crucial is that the single-layer semifinished fiber matrix product does not undergo any chemical conversion during the shaping.

In the production of such thermoplastic semifinished fiber plastic composite sheet products, depending on the material throughputs to be achieved, a distinction is made between film stacking, prepreg and direct processes. For a high material throughput in the case of direct processes, the matrix component and the textile component are brought together directly in the region of the material feed to the pressing process. This is generally associated with high plant complexity. In addition to the prepreg processes the film stacking process is often used for small to medium amounts. Here, a construct consisting of alternatingly arranged film and textile plies passes through the pressing process. The nature of the pressing process is determined by the required material output and the material diversity. A distinction is made here in order of increasing material throughput between static, semicontinuous and continuous processes. Plant complexity and plant costs rise with increasing material throughput (AKV—Industrievereinigung Verstärkte Kunststoffe [Industry Association for Reinforced Plastics] e.V., Handbuch Faserverbund-Kunststoffe [Handbook of Fiber Composite Plastics], 3rd ed. 2010, Vieweg-Teubner, 236).

But if shaping is effected simultaneously in process step e), the cooling to a temperature below the melting temperature of the thermoplastic or of the thermoplastic composition, preferably to room temperature (23+/−2° C.), is followed by cooling and removal of the door module from the compression mold in the form of a negative mold of a door module.

If, by contrast, the single-layer semifinished fiber matrix product is used in the form of a finished sheet material, this is subjected to a subsequent shaping step after production thereof. The manufacturing methods of plastics shaping are classified in Germany according to DIN 8580. Preferred shaping methods are the compression molding method (see, for example EP 1 980 383 A2) and die forming, preferably the die shaping method (see: C. Hopmann, R. Scholdgen, M. Hildebrandt, Inline-Imprägniertechnik mit Thermoplasten, Flexible Serienfertigung von thermoplastischen FVK-Bauteilen [Inline Impregnation Methodology with Thermoplastics, Flexible Mass Production of Thermoplastic FRP Components], IKV at RWTH Aachen, Plastverarbeiter 15 Oct. 2014).

In compression molding, all the requisite process steps are effected in the sequence of forming→heating→impregnating/consolidating→cooling in a closed mold. The textile semifinished product is inserted into a metal mold, cold-formed and heated via conduction of heat by contact with the mold at low pressure. On attainment of the melting temperature of the matrix polymer, a higher pressure is applied for impregnation and consolidation, followed by cooling.

In die forming, the single-layer semifinished fiber matrix product to be used, which has already been cut to size from sheet material, is heated up by a heating system outside the shaping mold until it plastifies. Then a transfer system ensures the transport of the plastified semifinished fiber matrix product cutout from the heating system to the compression mold, which is kept at a constant temperature below the solidification temperature of the thermoplastic or of the thermoplastic composition. The semifinished fiber matrix product cutout is then shaped in the shaping mold to give the component and passively cooled.

In a preferred embodiment, in process step f), the semifinished fiber matrix product to be manufactured—i.e. still during its production—is shaped by a shaping process to be employed simultaneously to the desired geometry or configuration of a door module, i.e. process steps f) and g) are conducted simultaneously. Preferred shaping processes for the simultaneously with its production of a geometric configuration of a semifinished fiber matrix product to be manufactured in process step f) are mold compression, die cutting, pressing or any method using heat and/or pressure. Particular preference is given to pressing and die cutting. In the shaping process, pressure is preferably applied by the use of a hydraulic compression mold. In the pressing or die-cutting operation, the semifinished fiber matrix product is preheated to a temperature above the melting temperature of the at least one thermoplastic or thermoplastic composition and converted to the desired shape or geometry with a molding device or a mold, especially at least one compression mold.

Shaping methods to be utilized in accordance with the invention are described in chapter 10, Pressverfahren für kontinuierliche FV-Thermoplasten [Compression Methods for Continuous FR Thermoplastics], Urs Thomann, in Composites Technologie, Prof. Dr. Paolo Ermanni, Script for ETH lecture 151-0307-00L, Zurich August 2007, Version 4.0.

Process Step h)

In one embodiment, at least one aftertreatment may follow in process step h).

In a preferred embodiment, the aftertreatment is a thermal treatment step. Heat treatment is a thermal treatment that serves to increase crystallinity for improvement of strength and chemical stability, to reduce internal stresses that result from extrusion or material removal, and to increase dimensional stability over a wide temperature range. By heat treatment, in the case of polyamide by thermal aftertreatment for half a day to one day, preferably in a thermal treatment fluid at 140° C. to 170° C., it is possible to largely eliminate internal stresses within the single-layer semifinished fiber matrix product and hence within the door module. The heat treatment also leads to postcrystallization of incompletely crystallized products, with occurrence firstly of rising density, abrasion resistance, stiffness and hardness and secondly of low post-shrinkage, in some cases also of slight warpage of the parts. The nature, temperature and duration of the heat treatment depends on the thermoplastic or thermoplastic composition to be used in each case and on the wall thickness of the single-layer semifinished fiber matrix product used. The person skilled in the art will ascertain the crucial parameters for process step h) by suitable preliminary tests. Useful thermal treatment fluids include thermally stable mineral oils, paraffin oils and silicone oils. The heat-treated parts must be cooled down gradually. See also:
https://de.wikipedia.org/wiki/Kristallisation_(Polymer)

In a further preferred embodiment, the aftertreatment is the molding-on of functional elements or the insert molding of the edges of the door module. The molding-on of further functional elements by casting or injection molding, preferably injection molding, can be effected over the full area or in a partial or circumferential manner. The injection molding may be undermolding and/or molding-on and/or insert molding. Preference is given to employing in-mold forming (IMF), an integrative special injection molding process used for production of hybrid structural components from different materials; see http://www.industrieanzeiger.de/home/-/article/12503/11824771/. IMF makes it possible to include exposed reinforcing fibers in the edge region of a semifinished fiber matrix product. This affords a structural component having particularly smooth edges. However, IMF also allows a functional element for molding-on to be molded and simultaneously joined to the semifinished fiber matrix product component, in particular without the use of additional adhesives. The principle of IMF is also a subject of DE 4101106 A1, U.S. Pat. Nos. 6,036,908 B, 6,475,423 B1 or WO 2005/070647 A1.

Thermoplastics are preferably useful for an injection molding composition for use in accordance with the invention for employment in IMF, preferably polyamides, especially PA 6, PA 66 or aromatic polyamides such as polyphthalamide, polysulfone PSU, polyphenylene sulfide PPS, polyphthalamides (PPA), poly(arylene ether sulfones), such as PES, PPSU or PEI, polyesters, preferably polybutylene terephthalate (PBT) or polyethylene terephthalate (PET), polypropylene (PP), polyethylene (PE) or polyimides (PI). There are further execution variants in DE 10 2006 013 684 A1.

In a very particularly preferred embodiment of a door module, both the semifinished fiber matrix product component and the injection molding component to be employed, preferably by IMF, have been manufactured from the same thermoplastic polymer. More preferably, the matrix of the single-layer semifinished fiber matrix product and the injection molding component are based on polyamide. In this case, especially for door modules, Durethan® BKV 235XCP, Durethan® 240 XCP or Durethan® BKV 55 TPX from Lanxess Deutschland GmbH, Cologne, are suitable.

Preferred functional elements made of the injection molding component are fixings or holders or other applications which must be formed not by the semifinished fiber matrix product component but, due to possible geometric complexity, by the injection molding component.

Functional elements can be attached during the shaping in process step f) or else subsequently in the course of process step h). For subsequent attachment of functional elements, especially for performance of IMF, the door module obtainable after method step e) is inserted into a shaping mold, preferably an injection mold, with an appropriately shaped mold cavity. It is preferably plastified beforehand in the region of attachment of the functional element. The injection molding component is then injected. The aim here is to produce a cohesive bond between the thermoplastic of the semifinished fiber matrix product component and the thermoplastic of the injection molding component. Such a cohesive join is best achieved when both plastics have the same polymer basis. It is preferable in accordance with the invention when both components are based on polyamide, especially on nylon-6. Moreover, process parameters such as melting temperature and pressure also play a role.

It is preferable when the injection molding in process step h) is effected at a temperature in the range from 200° C. to 320° C., preferably in the range from 240° C. to 290° C., further preferably in the range from 240° C. to 270° C.

It is also advantageous when the injection molding in process step h) is effected at a pressure in the range from 10 bar to 2000 bar, preferably in the range from 200 bar to 1500 bar, further preferably in the range from 500 bar to 1300 bar.

Use

The present invention finally relates to the use of at least one single-layer, continuous fiber-reinforced semifinished fiber matrix product as door module, preferably in buildings or in vehicles. Preferred vehicles are motor vehicles. Preferred motor vehicles are those based on internal combustion engines, electrical motor vehicles or hybrid motor vehicles.

The present invention preferably relates to the use of single-layer semifinished fiber matrix products comprising
  1 to 100 semifinished fiber product plies of continuous fibers, preferably 2 to 40 semifinished fiber product plies of continuous fibers, more preferably 2 to 10 semifinished fiber product plies of continuous fibers, wherein the semifinished fiber product plies each have a basis weight in the range from 5 g/m² to 3000 g/m², preferably in the range from 100 g/m² to 900 g/m², more preferably in the range from 150 g/m² to 750 g/m², and the entirety of all semifinished fiber product plies has been impregnated with at least one thermoplastic having an MVR to ISO 1133 in the range from 1 cm³/10 min to 100 cm³/10 min, wherein the thermoplastic is selected from the group of the polyolefins, vinyl polymers, polyacrylates, polyamides, polyurethanes, polyureas, polyimides, polyesters, polyethers, polystyrenes, polyhydantoins, polyphenylene oxides (PPOs), polyarylene sulfides, polysulfones, polycarbonates (PCs), polyphthalamides (PPAs), polymethylmethacrylates (PMMAs), styrene-acrylonitriles (SANs), TPOs (olefin-based thermoplastic elastomers), TPUs (thermoplastic polyurethanes) and polyoxymethylenes (POMs), and the semifinished fiber matrix product has a proportion by volume of fiber materials defined according to DIN 1310 in the range from 5% to 90% by volume, preferably in the range from 30% to 60% by volume, more preferably in the range 45% to 55% by volume, for production of door modules, has a proportion by volume of air of less than 15% by volume, preferably less than 10% by volume, more preferably less than 5% by volume, for production of door modules.

A door module of the invention is especially suitable for use in vehicles, preferably in motor vehicles. Door modules of the invention are notable for the following properties:

significantly higher energy absorption compared to a pure plastic solution, a pure metal variant, and also compared to a hybrid plastic metal variant, given the same weight in each case, which is of considerable significance in the event of a crash;

the components, by comparison with thermoset, long glass fiber-reinforced materials, need not be reworked;

no investment for sheet metal forming molds is needed by comparison with pure sheet metal variants and plastic metal hybrids;

it is possible to weld components onto plastic components, and hence further functions are closely bonded to the door module or associated with its function, for example holders for sensors.

By comparison with prior art door modules, a door module of the invention offers considerable advantages:

lower weight (compared to plastic metal hybrids, sheet metal, cast aluminum)

better mechanical characteristics, higher energy absorption better stability in the event of a crash, even at particularly low temperatures ≤−30° C.

media resistance no delamination.

Examples

To demonstrate that a single-layer semifinished fiber matrix product to be processed in accordance with the invention to give a door module or single-layer semifinished fiber matrix product incorporated at least partly in the applications mentioned has a lesser tendency to delaminate than a multilayer composite according to the prior art, test specimens were subjected to a mechanical test and this was used to determine the composite strength using tensile tests according to EN ISO 527 for determination of ultimate tensile stress, elongation at break and modulus of elasticity at a defined temperature. EN ISO 527-1 (latest edition of April 1996, current ISO version February 2012) is a European standard for plastics for determination of tensile properties which are determined by a tensile test with a tensile tester. For this purpose, a specially designed test specimen holder was used, which enabled simple pushing-in and fixing of the cross-tension sample used as test specimen under tensile stress.

The testing was conducted on a Zwick UTS 50 tensile tester from Zwick GmbH & Co. KG, Ulm, with introduction of force by means of a mechanical clamping head. Each test specimen, referred to hereinafter as cross-tension sample, consisted of a semifinished fiber matrix product strip (55×40×2 mm³) onto which a fin (40×40×4 mm³) of nylon-6 had been injection-molded.

Feedstocks

Thermoplastic Matrix 1: Nylon-6 (PA6)

Nylon-6:

Injection molding type, free-flowing, finely crystalline and very rapidly processable (BASF Ultramid® B3s), with a density of 1.13 g/cm³ and a melt flow index MVR of 160 cm³/10 min [test conditions: ISO1133, 5 kg, 275° C.] or a relative viscosity number (0.5% in 96% $H_2SO_4$, ISO 307, 1157, 1628) of 145 cm³/g.

Thermoplastic Matrix 2: Nylon-6 (PA6)

Nylon-6:

Film type, unreinforced, moderately free-flowing (BASF Ultramid® B33 L), with a density of 1.14 g/cm³ and a relative viscosity number (0.5% in 96% $H_2SO_4$, ISO 307, 1157, 1628) of 187-203 cm³/g.

Semifinished Fiber Product

Balanced roving glass weaves (YPC ROF RE600) consisting of 1200 tex warp and weft filaments in a 2/2 twill weave with a thread density of 2.5 threads/cm. Total basis weight 600 g/m², with 50% in warp direction and 50% in weft direction. Weave width 1265 mm, roll length 150 lfm. Modification of the weft threads with specific size adapted to the polymer system (PA in the examples section).

Semifinished Fiber Matrix Product (1)

Semifinished fiber matrix product (1) was produced in a static hotplate press. Semifinished fiber matrix product (1) with an edge length of 420 mm×420 mm consisted of 4 plies of semifinished fiber product and an amount of polymer composed exclusively of thermoplastic matrix 1, which was applied and distributed homogeneously over the fiber plies and resulted in a fiber volume content of 47% or in a thickness of 2.0 mm. For consolidation and impregnation, a surface pressure of 24 bar and a temperature of 300° C. were applied for 240 s. Subsequent cooling to room temperature was effected over 300 s at constant pressure. The semifinished fiber product plies were thus homogeneously embedded in the resultant semifinished fiber matrix product (1) in sheet form; no material/phase boundaries formed within the matrix owing to the homogeneous single-layer matrix system; no physical distinction was possible between the inner embedding composition and surface.

Semifinished Fiber Matrix Product (2)

Semifinished fiber matrix product (2), as an example of a multilayer construct according to the prior art, was likewise produced in a static hotplate press. The semifinished product intended for the multilayer construct with an edge length of 420 mm×420 mm consisted of 4 plies of semifinished fiber product and an amount of polymer composed exclusively of thermoplastic matrix 1, which was applied and distributed homogeneously over the fiber plies and resulted in a fiber volume content of 49% or in a thickness of 1.9 mm. For consolidation and impregnation, a surface pressure of 24 bar and a temperature of 300° C. were applied for 240 s. Subsequent cooling to room temperature was effected over 300 s at constant pressure.

In order to produce a layered construct, a 50 μm-thick film of thermoplastic matrix 2 was applied to each side of this intermediate product in a subsequent processing step. This again was effected in a static hotplate press at a temperature of 260° C. and a surface pressure of 9 bar that was maintained for 120 seconds. The cooling to room temperature within 60 s was effected at a surface pressure of 7.5 bar. Because of the different viscosities of the thermoplastic matrices 1 and 2, the structure of the semifinished fiber matrix product was inhomogeneous. Within the semifinished fiber matrix product (2) in sheet form that was produced in this way, the semifinished fiber plies were embedded homogeneously in the matrix 1, whereas exclusively matrix 2 was present at the two surfaces, analogously to the semifinished products according to WO 2012/132 399 A1 and WO 2010/132 335 A1.

Testing

The test specimen used for the mechanical testing of the composite adhesion between the semifinished fiber matrix product (1) and (2) and thermoplastic that had been molded-on by injection molding was what is called a cross-tension sample. Each of these cross-tension sample test specimens consisted of a semifinished fiber matrix product strip (55×40×2 mm³) onto which a fin (40×40×4 mm³) of nylon-6 had been injection-molded. With regard to cross-tension samples see also W. Siebenpfeiffer, Leichtbau-Technologien im Automobilbau [Lightweight Construction Technologies in Automaking], Springer-Vieweg, 2014, pages 118-120. In the cross-tension test, the cross-tension sample is then clamped in a holder and subjected to a tensile force from one side. The tensile test is illustrated in a stress-strain diagram (modulus of elasticity).

For each of the cross-tension tests to be conducted in the context of the present invention, an inventive, heated, unformed semifinished fiber matrix product (1) and also a semifinished fiber matrix product (2) of multilayer construction according to the prior art were each back-molded with a total of 22 identical fins. The respective semifinished fiber matrix product (1) or semifinished fiber matrix product (2) was previously provided with an 8 mm hole at the gate mark, in order that there was no additional resistance to the formation of fins for the polyamide melt to be molded on. After processing, individual sheet sections suitable for testing were cut out at selected positions along the flow pathway using a bandsaw of the "System Flott" type from Kräku GmbH, Großseifen.

For mechanical testing of the composite strength, indices were determined from tensile tests on the cross-tension samples. In this case, a specially designed test specimen holder was used, which enabled simple pushing-in and fixing of the cross-tension sample under tensile stress. The testing was conducted on a Zwick UTS 50 tensile tester from Zwick GmbH & Co. KG, Ulm, with introduction of force by means of a mechanical clamping head. The parameters employed in the mechanical testing can be found in Table 1.

Semifinished fiber matrix product (1) and semifinished fiber matrix product (2) were tested to DIN 1310 for their fiber volume content. For statistical reasons 5 test specimens were analysed in each case. For the two semifinished fiber matrix products, the average fiber volume contents described above were ascertained.

The two semifinished fiber matrix products were also subjected to experimental analysis for their pore content, i.e. inclusion of air or gas. To this end, a General Electric Micro CT nanotom S computed tomography instrument was used to analyze tomographs of a cross section of semifinished fiber matrix product (1) and semifinished fiber matrix product (2). For statistical reasons three test specimens were analysed in each case, with 5 repeat measurements being performed on each of these. A pore content of 4-5% was ascertained for both semifinished fiber matrix products using optical evaluation software. For statistical reasons three test specimens were analysed in each case, with 5 repeat measurements being performed on each of these.

Semifinished fiber matrix product (1) was examined experimentally for its local proportion by volume of fibers. To this end, a General Electric Micro CT nanotom S computed tomography instrument was used to analyze tomographs of a cross section of semifinished fiber matrix product (1) and semifinished fiber matrix product (2). The glass fiber content inside the samples was evaluated down to a depth of 50 μm. For statistical reasons three test specimens of every semifinished fiber matrix product were analysed in each case, with 5 repeat measurements being performed on each of these. For semifinished fiber matrix product (2) no glass fibers were detected down to a depth of 50 μm since said fibers were all separated from the surface and covered by the unfilled surface layer. The proportion by volume of fibers in this region was thus 0%. In the semifinished fiber matrix product (1), rather than separating covering layer being found, the glass fiber bundles were homogeneously enclosed and uninterrupted up to the surface, and so that the claimed proportion by volume of fibers was also found in the region between the surface down to a depth of 50 μm.

Experimental Results

TABLE 1

| Test parameters in the tensile test | |
| --- | --- |
| Test parameter | Value |
| State of the test specimens | dry (80° C., vacuum dryer, about 200 h) |
| Testing speed [mm/min] | 10 |
| Maximum force absorbed [kN] | 50 |
| Initial force [N] | 5 |

A criterion defined for the composite strength was the maximum force measured that was determined in the tensile test. The first measurable drops in force were caused by the first cracks in the material, detachment processes, deformations or similar effects prior to attainment of the maximum force, and seemed unsuitable as a criterion for composite strength. The maximum force measured was obtained on failure of the cross-tension sample; it is therefore referred to hereinafter as breaking force. In principle, it should be noted that the maximum force may depend not only on the composite bonding and the geometry but always also on the test method and test conditions.

For every semifinished fiber matrix product, 10 fin pull-off tests were conducted in order to enable a statistically reliable conclusion.

In the case of semifinished fiber matrix product (1) (inventive), in all cases, there was purely cohesive failure of the thermoplastic matrix 1 directly at the uppermost semifinished fiber product ply of the semifinished fiber product.

In the case of the semifinished fiber matrix product (2) (noninventive), by contrast, there was always a mixed fracture consisting of cohesive and adhesive failure in the interface layer between thermoplastic matrix 1 and thermoplastic matrix 2. No cohesive failure of thermoplastic matrix 1 was found above the uppermost semifinished fiber product ply.

In the case of the noninventive semifinished fiber matrix product (2), the near-surface layer (surface) of thermoplastic matrix 2 was thus torn off the substrate consisting of semifinished fiber product and thermoplastic matrix 1, whereas, in the case of the inventive single-layer semifinished fiber matrix product (1), no such division was observed within a surface-parallel layer in the thermoplastic matrix 1.

TABLE 2

Statistical summary of 10 fin pull-off tests

| No. | Test result for semifinished fiber matrix product (1) | Test result for semifinished fiber matrix product (2) |
|---|---|---|
| 1 | + | − |
| 2 | + | − |
| 3 | + | − |
| 4 | + | − |
| 5 | + | − |
| 6 | + | − |
| 7 | + | − |
| 8 | + | − |
| 9 | + | − |
| 10 | + | − |

The results are assessed according to the magnitude of the pull-off force. A "+" indicates the higher pull-off force in each case for the two semifinished fiber matrix products compared with one another, whereas a "−" indicates the lower force, and a "+" symbolizes a pull-off force higher by at least 15%.

The test results show that the maximum force in the comparisons of the two semifinished fiber matrix products was always higher for the inventive single-layer semifinished fiber matrix product (1) than in the case of the semifinished fiber matrix product (2) with a layered construction. The mean value of the individual test results from the test series for the inventive single-layer semifinished fiber matrix product (1) was also well above that of the semifinished fiber matrix product (2).

In summary: Fin pull-off strength was much higher for the inventive single-layer semifinished fiber matrix product (1) than for the semifinished fiber matrix product (2), and therefore an inventive single-layer semifinished fiber matrix product, used as door module, has distinct advantages over semifinished fiber matrix products according to the prior art.

The invention claimed is:

1. A door module comprising at least one single-layer semifinished fiber matrix product comprising
    1 to 100 semifinished fiber product plies made of continuous fibers having a basis weight in the range from 5 g/m² to 3000 g/m²,
    and the entirety of all semifinished fiber product plies has been impregnated with at least one thermoplastic having an MVR to ISO 1133 in the range from 1 cm³/10 min to 100 cm³/10 min,
    wherein the thermoplastic is selected from the group of the polyolefins, vinyl polymers, polyacrylates, polyamides, polyurethanes, polyureas, polyimides, polyesters, polyethers, polystyrenes, polyhydantoins, polyphenylene oxides, polyarylene sulfides, polysulfones, polycarbonates, polyphthalamides, polymethylmethacrylates, styrene-acrylonitriles, olefin-based thermoplastic elastomers, thermoplastic polyurethanes and polyoxymethylenes,
    and this semifinished fiber matrix product has a proportion by volume of fiber materials defined according to DIN 1310 in the range from 5% to 90% by volume and a proportion by volume of air or gas of less than 15% by volume.

2. The door module as claimed in claim 1, wherein the semifinished fiber matrix product has a material thickness in the range from 0.05 mm to 6 mm.

3. The door module as claimed in claim 1, wherein the thermoplastic comprises the vinyl polymers and wherein said vinyl polymers are selected from the group of polyvinyl halides, polyvinyl esters and polyvinyl ethers.

4. The door module as claimed in claim 1, wherein the thermoplastic comprises polyolefins and wherein the polyolefins are polyethylene or polypropylene.

5. The door module as claimed in claim 1, wherein the thermoplastic comprises polyesters and wherein the polyesters are polyethylene terephthalate or polybutylene terephthalate.

6. The door module as claimed in claim 1, wherein the thermoplastic comprises polycarbonates based on 2,2-bis(4-hydroxyphenyl)propane, bis(4-hydroxyphenyl) sulfone, dihydroxydiphenyl sulfide, tetramethylbisphenol A, 1,1-bis(4-hydroxyphenyl)-3,3,5-trimethylcyclohexane or 1,1,1-tris(4-hydroxyphenyl)ethane.

7. The door module as claimed in claim 1, wherein the thermoplastic comprises polyphthalamide and wherein the polyphthalamide is PA 6T, PA 10T or PA 12T.

8. The door module as claimed in claim 1, wherein the polyamides have a relative solution viscosity in m-cresol in the range from 2.0 to 4.0, where the relative solution viscosity $\eta_{rel}$ is measured to EN ISO 307 in m-cresol at 25° C.

9. The door module as claimed in claim 8, wherein the thermoplastic comprises polyamide from the group of PA 66, PA 6 and PA 12.

10. The door module as claimed in claim 1, wherein the thermoplastic further comprises at least one thermal stabilizer.

11. The door module as claimed in claim 10, wherein the thermal stabilizer is a metal-based thermal stabilizers or an organic thermal stabilizers.

12. The door module as claimed in claim 11, comprising polyhydric alcohols.

13. The door module as claimed in claim 11, wherein the thermal stabilizer is a copper stabilizer.

14. A process for producing a door module, comprising:
    providing at least one single-layer semifinished fiber matrix product as claimed in claim 1,
    shaping and curing, in a mold, the single-layer semifinished fiber matrix product whereby the door module is formed, and
    removing the door module from the mold.

15. The process as claimed in claim 14, wherein the shaping is preceded by the process steps of impregnating and consolidating and optionally solidifying the entirety of all semifinished fiber product plies with at least one thermoplastic or with a thermoplastic composition.

* * * * *